Feb. 21, 1956          K. K. K. KRØYER          2,735,792
APPARATUS FOR THE CONTINUOUS CONVERSION OF STARCH
Filed July 17, 1951          2 Sheets-Sheet 1
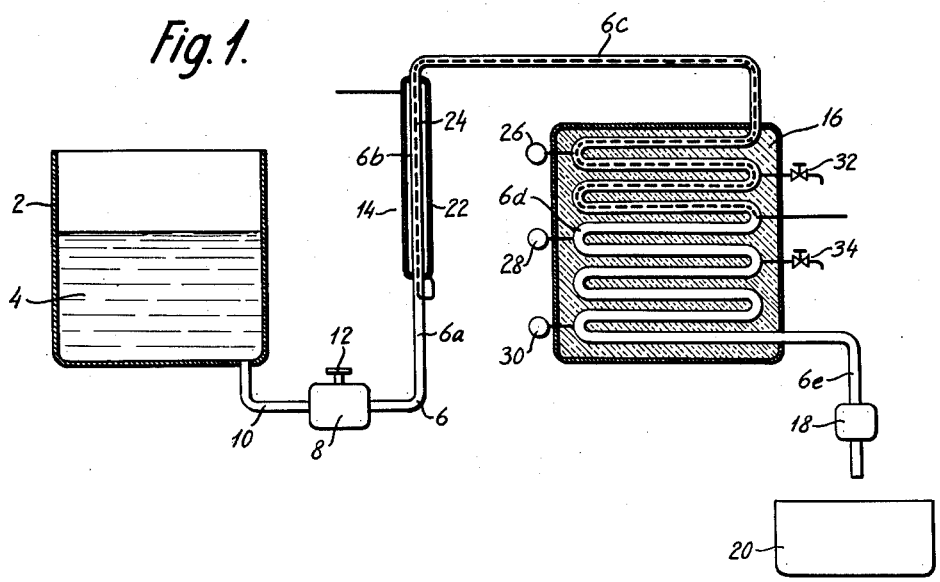
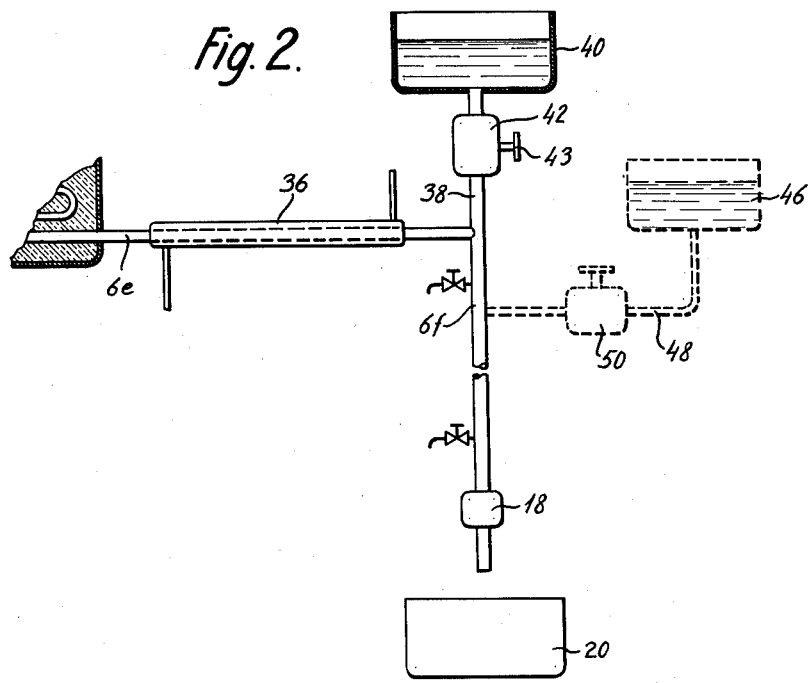
INVENTOR
K. K. K. Krøyer
BY Watson, Cole, Grindle & Watson
ATTORNEY

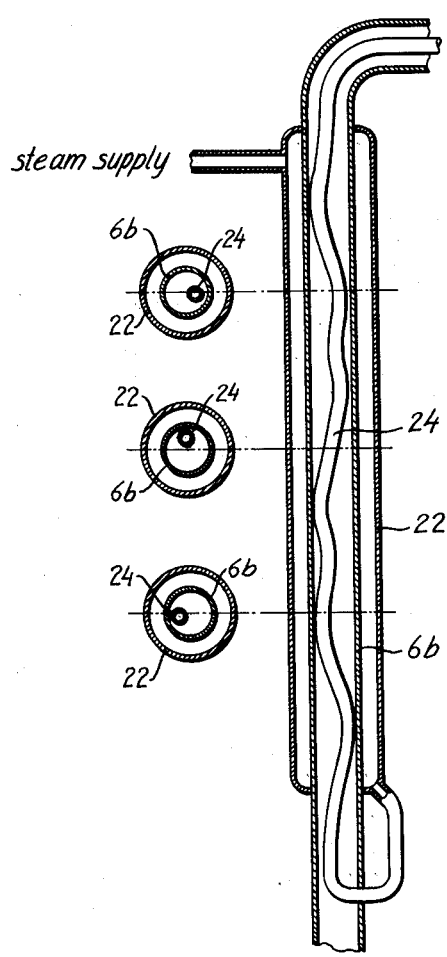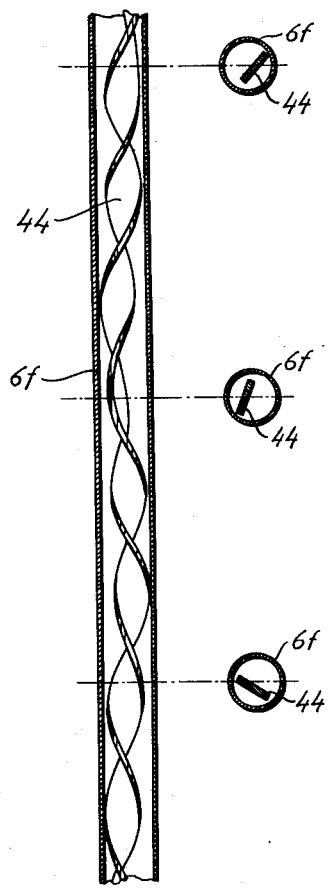

United States Patent Office 2,735,792
Patented Feb. 21, 1956

2,735,792

APPARATUS FOR THE CONTINUOUS CONVERSION OF STARCH

Karl Kristian Kobs Krøyer, Arhus, Denmark

Application July 17, 1951, Serial No. 237,202

7 Claims. (Cl. 127—1)

This invention relates to the conversion of polysaccharide materials, such as starch, in the production of dextrose-containing products and also so-called "glucose." For convenience, the description of the invention has been limited to starch but it will be understood that the invention is also applicable to other dextrose polymers such as the so-called "first greens" and "hydrols" which liquors are frequently reconverted to increase their dextrose content, i. e. to de-polymerize the polysaccharides.

The process adopted in most existing plants for the conversion of starch is a batch process in which a predetermined quantity of acidified starch liquor is first heated in an autoclave with steam injection for a time to be determined by an analysis of a small quantity of liquid drawn from the autoclave, and is then discharged from the autoclave and neutralized with an alkaline agent and subsequently refined by an adsorption and filtering treatment and concentrated.

The batch process suffers from considerable drawbacks. Since the relatively cold starch slurry must be pumped into boiling diluted acid in the autoclave at a rate slow enough to keep the contents of the autoclave boiling, which takes considerable time, and since also the emptying of the autoclave takes some time during which the conversion still proceeds, it is difficult to obtain an absolutely uniform conversion throughout the batch, and to obtain the desired average degree of conversion some portions of the starch liquor may therefore be over-hydrolized, and other portions under-hydrolized, which may have a bad influence on the taste, color, clarity and other properties of the final product and, in the case of crystalline glucose, also on the yield. Moreover, the checking of the progress of the conversion process is difficult to carry out in a satisfactory manner because the chemical or other analysis of a quantity of starch liquor drawn out from the autoclave takes appreciable time during which the whole batch may become over-hydrolized. To obtain a satisfactory circulation of the contents of the autoclave in order to promote the uniform heat transmission to all parts of the batch and thereby the uniformity of the hydrolysis, the concentration of the starting material should not be selected too high, and also the converted liquor will therefore contain relatively much water to be removed in the subsequent evaporating process. As regards the neutralization, it is observed that recent investigations have shown that in order to obtain the best possible product, it is essential that the neutralization be performed uniformly and practically instantaneously after the converted liquor has left from the conversion stage, and this is of course difficult to carry out when the liquor is discharged batch-wise from an autoclave, so that also from this point of view the autoclave process is not very satisfactory. Further it is observed that the batch process requires relatively much labor.

Various attempts have been made at performing the whole conversion process including the heating in a tubular converter, but as far as I am aware, none of these previous proposals have been successful.

It has been found that the main difficulty in performing the whole conversion process in a tubular converter is encountered in the initial heating stage, and the reason for this is that when the acidified starch slurry or liquor used as a starting material is heated it gelatinises and assumes a relatively high viscosity while passing through a certain temperature range until it finally becomes relatively liquid again at an elevated temperature. Consequently, if a starting material of relatively high concentration is used, this material while passing through the said temperature range, may clog the whole apparatus and at best offers a relatively high resistance to propulsion through the tubular converter thus tending to disturb the continuous flow and to minimize the capacity of the apparatus, and, besides, the heating tends to become non-uniform which again means that the hydrolization which commences already during this stage will proceed more rapidly in some particles of the medium than in others.

In a modified arrangement, a tubular converter is combined with a heating apparatus very similar to an autoclave in which the heating is performed by the injection of the starch medium in the form of a spray into steam present in the autoclave. While this method probably does eliminate the difficulties in the heating stage, it does not avoid some of the disadvantages of the autoclave method, such as the necessity of diluting the starting material and the impossibility of operating at a pressure above that of saturated steam at the operating temperature, and besides it requires relatively expensive and delicate apparatus and very accurate control and adjustment of the various factors.

It is one object of the present invention to overcome the difficulties encountered in the heating stage of a tubular converter so that the whole process of converting starch, including the heating, may be performed continuously in the tubular converter without any contact occurring between the starch medium under treatment and steam used for heating such medium.

Another object of the invention is to devise improved process and apparatus whereby the conversion of starch may be carried out in a tubular converter at a pressure above that of saturated steam at the temperature prevailing in the tubular converter.

A further object of the invention is to devise process and apparatus whereby improved flow conditions may be obtained in a tubular converter for the continuous conversion of starch.

A still further object of the invention is to obtain improved neutralization conditions in the process of converting starch.

A still further object of the invention is to provide means whereby a clarifying or decolorizing agent may be continuously added to the converted starch liquor without necessitating a separate stage of the apparatus.

With these and other objects in view the invention consists in the novel steps, structural features, and combinations which will now be described in detail with reference to the accompanying drawing and which are defined in their general aspect in the appended claims.

In the drawing,

Figs. 1 and 2 illustrate diagrammatically two different forms of a tubular starch converter constructed in accordance with the principles of the invention, Fig. 3 shows a longitudinal section through one form of a heater forming part of the tubular converter, and Fig. 4 shows a longitudinal section through a portion of the pipe conduit of the tubular converter intended to perform the neutralization stage.

In Fig. 1, 2 is a vessel from which acidified starch liquor or slurry 4 is supplied to a pipe conduit 6 by means of a pump 8 connected to the bottom of the vessel 2 by means of a pipe 10. The starch slurry or liquor may be supplied to the vessel 2 from any suitable source not shown or may be prepared in the vessel 2 itself. It is of course essential that the concentration and the pH-value of the acidified starch liquor in the vessel 2 be kept at suitable values, and preferably the starch slurry in the vessel 2 should also be constantly agitated, but since means for performing these functions are well known in the art and do not form part of the invention, it is deemed unnecessary to show or describe such means. The acidification of the starch slurry or liquor is ordinarily made by means of hydrochloric acid as in conventional starch converters, but also other acids such as sulphuric acid may be used.

The pump 8 may advantageously be of the reciprocating type such as a piston or diaphragm pump, and it may be constructed with well known means whereby the effective stroke of the pump, and thereby the quantity of liquor supplied to the pipe 6 in each stroke, may be controlled such as by means of a control handle 12. If desired, the pump may also be constructed to operate at a variable and controllable speed.

The pipe conduit 6 is composed of different parts, viz. a first section 6a leading from the pump 8 to a heater generally indicated at 14, a second section 6b extending through said heater 14, a third section 6c leading from the heater 14 to an insulated box 16, a fourth section 16d in said insulated box 16, and a fifth section 6e leading from said insulated box 16 through outlet control means such as a valve 18 to a point above a discharge vessel 20 serving to receive the converted starch liquor.

The heater 14 is shown in more detail in Fig. 3. As is apparent from this figure, the pipe section 6b is surrounded by a heating jacket 22 while an inner heating tube 24 extends length-wise through the pipe section 6b. In the example shown, the heating jacket 22 and the inner heating tube 24 are shown as being connected in series to a common steam supply, but of course a parallel connection might be used instead if preferred, or alternatively any other suitable heating means may be used whereby heat is supplied to the wall of the pipe section 6a from outside as well as to the wall of the inner heating tube 24 from inside. In this manner, the acidified starch propulsed through the pipe section 6b is very rapidly heated so that the critical temperature range in which the starch medium assumes the state of highly viscose gelatine is rapidly passed.

It will be noted that the inner heating tube 24 takes an irregular path through the pipe section 6b. This has the effect of exerting on the starch medium propulsed through this pipe section a kneading or agitating effect which highly contributes towards obtaining a uniform and rapid heating of all particles of the starch medium. If the starch medium were allowed to flow regularly through the pipe section 6b, the particles of the starch medium in contact with the heated inner and outer walls would have a tendency to be squeezed out length-wise of the pipe as soon as they were liquefied, while the transfer of heat to particles remote from the heated walls would be slow. However, by the kneading or agitating effect caused by the irregular shape of the inner heating tube, the particles heated by direct contact with the heated walls will be constantly mixed into the mass of the starch medium thereby contributing towards transferring heat to other particles of the starch medium. While the inner heating tube may if desired form a helix, it is preferred to have it bent and wound alternately one way and the other as is apparent from Fig. 3 and the three cross sections shown in connection with that figure. However, any irregularity of the inner heating tube or of the wall of the pipe section 6b will have some effect in the way of kneading or agitating the starch medium and will thus result in advantages as compared with a regular cylindrical shape of the inner heating tube and the pipe section 6b respectively. It is observed that where reference is made in the following to irregular wall portions of the inner and outer heating chamber constituted in the example by the tube 24 and the pipe section 6b respectively, this term is intended to include any shape of the said wall portions other than a regular cylindrical shape. Thus, the tube 24 or the pipe section 6b may also be constructed with enlargements and contractions to form irregular wall portions, though preferably the flow section should be substantially constant throughout the length of the pipe section 6b. Moreover, depending on the dimensions of the apparatus a plurality of tubes 24 which may e. g. be twisted together, may be used instead of the single tube 24.

If the pump 8 is constructed, as above described, as a reciprocating pump imparting to the starch medium a rhythmically pulsating movement to the starch medium, this will further improve the kneading or agitating effect in the flow space between the inner heating tube 24 and the wall of the pipe section 6b.

As will be seen, the inner heating tube 24 is extended in the example shown through the whole length of the pipe section 6c, and part of the length of the pipe section 6d within the insulating box 16. Preferably, the pipe section 6c should be insulated in order to avoid unnecessary losses of heat.

It will be understood that after the starch medium has been rapidly heated to a temperature above the critical temperature range in the heater 14, the starch medium is kept at an elevated temperature throughout the pipe sections 6c and 6d owing to the heat transfer from the inner heating tube 24 in combination with the insulation surrounding these pipe sections. Of course, the extension of the inner heating tube 24 through the pipe section 6c and part of the pipe section 6d may be dispensed with according to circumstances, although it has proved preferable to thus extend a zone of limited heating up to a point well within the insulating box 16. When the starch medium leaves the heater, it is ordinarily at a temperature at which the hydrolization of the starch medium proceeds at a relatively high speed, and this temperature may be somewhat increased up to the point where the inner heating tube leaves the pipe section 6d. Thus, the pipe sections 6c and 6d act as a tubular converter in which the starch medium passing continuously through these pipe sections is at a temperature and a viscosity suitable for hydrolization, and the length of the pipe sections 6c and 6d is so selected that the conversion process is completed to the desired extent when the starch medium proceeds to the pipe section 6e and thence to the outlet control means 18.

In the example shown, the outlet control means 18 may be in a form of a reduction valve so adjusted as to keep the pressure in the tubular converter at a predetermined value. Alternatively, the means 18 may also be in the form of a valve controlled by the pressure at any other point of the tubular converter than the outlet end thereof. Suitable instruments 26, 28 for checking the condition of the starch medium, e. g. as regards temperature, pressure and pH-value may be connected to suitable points of the tubular converter, and to other points of the latter there may be connected tap valves 32 and 34 for drawing out small quantities of the starch medium for chemical or other analysis.

It is an important advantage of the apparatus according to the invention, that since there is no contact between the heating steam and the starch medium, the pressure within the tubular converter may be kept at a value considerably above the pressure of saturated steam at the temperature prevailing in the tubular converter. In this respect, it should be noted that the pressure is one of the factors on which the hydrolization speed depends, other factors being the temperature and the acid content as well as the time of the treatment. If the latter factors are increased above a certain limit they will have a disadvantageous influence on the resulting product, whereas the pressure has proved to be a less critical factor. While a pressure amounting to about 50% above that of the saturated steam pressure is already commercially successful, it is preferred to employ a pressure amounting to at least about 100% above said saturated steam pressure.

It is also an important advantage of the apparatus that all particles of the starch medium are subjected to an exactly uniform treatment during the same period of time and without coming to rest at any moment. In this manner over-hydrolization of particles of the medium is practically excluded. Owing to the uninterrupted movement of all particles of the starch medium, the danger of deposition of material and possibly clogging of the apparatus has been reduced to a minimum. It is also believed that the movement in itself has a promoting influence on the hydrolysis. E. g. a rhythmically pulsating movement has been found to be particularly advantageous because it results in an intermittent slight agitation of the starch medium at all points of the tubular converter. Such a rhythmically pulsating movement may be obtained, as explained hereinbefore, by using a reciprocating pump 8, but of course it would also be possible to use a continuous pump and a rhythmically operated outlet valve 18. It should be understood, however, that the rhythmically pulsating movement is not absolutely necessary in order to obtain good results. It would also be possible to operate at a constant velocity flow, and in such cases, the pump might also be constructed in known manner to supply the starch liquor at a predetermined pressure while at the same time constructing the outlet valve 18 to control the speed of flow through the tubular converter independently of the pressure prevailing in the latter. An arrangement of the latter type may of course also be used, though hardly with any particular advantage, in case a pulsating pump is used.

Owing to the continuous operation of the tubular converter, it is very simple and expedient to keep a full check on the process and the resulting product since it is possible without interrupting or interfering with the process to analyse small quantities of the resulting product and, if desired, the product at intermediate points of the converter, and to make such slight adjustments as may be necessary to ensure the desired character of the final product.

It will also be seen that the process may be carried out with a minimum of labor because the whole apparatus works automatically.

A further advantage is that owing to the rapid heating and the kneading and agitating in the heater, it is possible to use a relatively concentrated starting material so that there will be relatively little water to remove from the final product, the much more so as the heating is effected without dilution resulting from injected steam.

In the modified form of the apparatus shown in Fig. 2 the pipe section 6e is surrounded by a cooling jacket 36 and has its discharge end connected to a pipe section 6f extending at right angles to the pipe section 6e. A pipe 38 extending from the bottom of a vessel 40 through a pump 42 is branched into the pipe conduit 6e, 6f at the bend joining the two sections 6e and 6f. The vessel 40 contains a supply of a liquid carrying a neutralization agent. If hydrochloric acid is used for the acidification of the starch medium, the neutralization liquid in the vessel 40 may e. g. be a solution of soda ash. If, on the other hand, sulphuric acid is used for the acidification, the neutralization liquid may be a suspension of calcium carbonate. The pump 42 may advantageously be constructed similarly as the pump 8, i. e. as a reciprocating piston or diaphragm pump having a control handle 43. By means of this pump the neutralization agent is branched into the stream of the converted starch liquor so that the neutralization takes place continuously and immediately as the starch leaves the conversion stage which, as previously mentioned, is essential in order to obtain an improved product. The cooling jacket 36 serves to reduce the temperature of the converted starch medium to a value suitable for the neutralization process. Moreover, the cooling effect may be so selected that the converted starch medium assumes a temperature well below the boiling point at atmospheric pressure so that there will be no violent blowing of steam at the outlet end of the tubular converter. Of course, such a cooling jacket might also be used in the embodiment of Fig. 1. The neutralization is completed or substantially completed during the flow of the medium through the pipe section 6f which is given a suitable length to secure this result. The converted and neutralized starch medium is then discharged to a vessel 20 through outlet control means 18 in the same manner as in Fig. 1.

In order to obtain an efficient mixing of the converted starch medium and the neutralization agent in the pipe section 6f, the latter may e. g. be constructed as shown in Fig. 4. From this figure, it will be seen that in the pipe section 6f there is arranged a metal strip twisted in an irregular manner such as will be seen from the cross-sections indicated in the figure. Preferably, the strip 44 is twisted alternately one way and the other and is given dimensions such that it does not in its twisted state fill out the whole cross-section of the pipe section 6f, but comes into contact with the latter in spaced points only. In this manner the strip 44 does not just divide the free cross-section of the pipe section 6f into two halves, but is very effective in causing irregular flow conditions so as to exert a stirring or agitating effect on the medim flowing through the pipe section 6f.

It will be understood that the continuous neutralization described is by far superior to the customary neutralization in an open vessel, because by the latter method, in spite of all precautions such as using diluted neutralization agent and violently agitating the mixture during slow pouring of said agent, it is extremely difficult to avoid local over-neutralization giving rise to miscoloring of the final product. On the other hand, in the method according to the invention, there will never be more neutralizing agent present in any elemental length of the tube than necessary to neutralize the amount of starch liquor present in the same elemental length of the pipe.

As is well known, it is a common practice to clarify and decolorize the converted and neutralized starch medium by an adsorption and filtering process in which the impurities are caused to adhere to or are detained by particles of an adsorption or filtering agent such as activated carbon or bentonite which is subsequently removed by filtration.

According to the present invention, the adsorption or filtering agent may be added to the starch medium while the latter is still flowing in the pipe conduit of the converter. Thus, in the embodiment of Fig. 2, this might in some cases be effected by simply suspending the adsorption agent in the neutralization liquid in the vessel 40. Alternatively, a suspension of the adsorption agent may be branched into the pipe section 6f at a later point from a separate vessel 46 through a pipe 48 by means of a pump 50. In both cases, the liquid leaving the converter is ready for filtration without any necessity of adding the adsorption or filtering agent in a separate operation. The pump 50, similarly as the pumps 8 and 42, may preferably be of the pulsating type, and the special construction of the pipe section 6f shown in Fig. 4 will ensure a very intimate mixng of the adsorption agent with the converted starch medium.

*Example*

Obviously, the dimensions of the apparatus and the various factors of the process are variable within very wide limits to suit the needs in each partcular case, and no standard values of general application can therefore be given. However, just to give an idea of a possible set of values that may be used in one specific embodiment of the invention, the following example is given.

Starting material: starch slurry at 24° Baumé acidified by 3 cm³. of concentrated hydrochloric acid per kg of starch.

Conversion temperature: 160° C. (within insulating box).
Conversion pressure: 15 kgs. per cm².
Converter conduit: inner diameter 45 mm, length 80 m. (major portion within insulating box).
Heater conduit: outer diameter 75 mm.
Slurry pump: 60 strokes per minute, 15 l. per minute.
Neutralization agent: 30 gr. of soda ash (calculated as dehydrated) per litre of water, neutralization up to pH 5–6.

I claim:

1. An apparatus for the continuous conversion of polysaccharide materials comprising a heat exchanger having a continuous flow space between outer and inner heating surfaces, means for continuously supplying convertible polysaccharide medium to one end of said flow space at a pressure substantially above that of saturated steam at the maximum temperature of the polysaccharide medium occurring in said heat exchanger and a tubular converter connected to the other end of said flow space for receiving the polysaccharide medium heated therein said heat exchanger and said tubular converter being constructed to form a continuous conduit system for the treatment of a continuous flow of said polysaccharide medium in the absence of steam.

2. An apparatus as in claim 1 and in which said continuous flow space is constructed with irregular wall portions of a shape to exert a stirring and agitating effect on the polysaccharide medium propulsed through said space.

3. An apparatus as in claim 1 in which said heat exchanger comprises a pipe for the passage of the polysaccharide medium, a heating jacket surrounding said pipe, and an inner heating tube extending lengthwise through said pipe.

4. An apparatus as in claim 3 in which said inner heating tube is constructed with irregular wall portions of a shape to cause a stirring and agitating effect to be exerted on the polysaccharide medium propulsed through the space formed between the inner wall of said pipe and the outer wall of said inner heating tube.

5. An apparatus for the continuous conversion of polysaccharide materials comprising a heat exchanger having a continuous flow space between outer and inner heating surfaces constructed with irregular wall portions of a shape to exert a stirring and agitating effect on polysaccharide medium propulsed through said space, means for causing convertible polysaccharide medium to flow at a rhythmically pulsating movement from one end of said flow space to the other end thereof at a pressure substantially above that of saturated steam at the maximum temperature of the polysaccharide medium occurring in said heat exchanger, and a tubular converter connected to the last mentioned end of said flow space for receiving the polysaccharide medium heated therein said heat exchanger and said tubular converter being constructed to form a continuous conduit system for the treatment of a continuous flow of said polysaccharide medium in the absence of steam.

6. An apparatus for the continuous conversion of polysaccharide materials comprising a pipe conduit, means for continuously supplying convertible polysaccharide medium to one end of said pipe conduit at a pressure substantially above that of saturated steam at the maximum temperature of said polysaccharide medium occurring in said pipe conduit, a heating jacket surrounding a portion of said pipe conduit to form a heat exchanger, insulating means enclosing another, coiled portion of said pipe conduit, and an inner heating tube extending lengthwise through said pipe conduit from the input end of said heat exchanger to a point inside said insulating means.

7. An apparatus for the continuous conversion of polysaccharide materials comprising a pipe conduit, reciprocating pump means for rhythmically supplying predetermined quantities of convertible polysaccharide medium to one end of said pipe conduit, a heating jacket surrounding a portion of said pipe conduit to form a heat exchanger, an inner heating tube extending lengthwise through the portion of said pipe conduit surrounded by said heating jacket to form an annular space for the flow of the polysaccharide medium between the inner wall of said pipe conduit and said heating tube, said annular space having irregular wall portions of a shape to exert a stirring or kneading effect on the polysaccharide medium propulsed therethrough, means for keeping the polysaccharide medium at a temperature above 100° C. over a considerable portion of the length of said pipe conduit, and pressure responsive means for so controlling the rate of discharge from the other end of said pipe conduit as to keep the pressure in the latter at a value substantially above the temperature of saturated steam at the temperature prevailing in said pipe conduit.

References Cited in the file of this patent

UNITED STATES PATENTS

| | | |
|---|---|---|
| 1,927,312 | Hagen | Sept. 19, 1933 |
| 1,928,891 | Hagen | Oct. 3, 1933 |
| 2,233,243 | Burns | Feb. 25, 1941 |
| 2,304,679 | Christiansen | Dec. 8, 1942 |
| 2,313,574 | Payne | Mar. 9, 1943 |
| 2,337,688 | Sipyaguin | Dec. 28, 1943 |
| 2,359,763 | Horesi | Oct. 10, 1944 |
| 2,481,436 | Miller | Sept. 6, 1949 |
| 2,565,404 | Staerkle | Aug. 21, 1951 |

OTHER REFERENCES

Chemical Eng. Progress, vol. 44, 1948, pgs. 399 to 404.